United States Patent Office 3,528,607
Patented Sept. 15, 1970

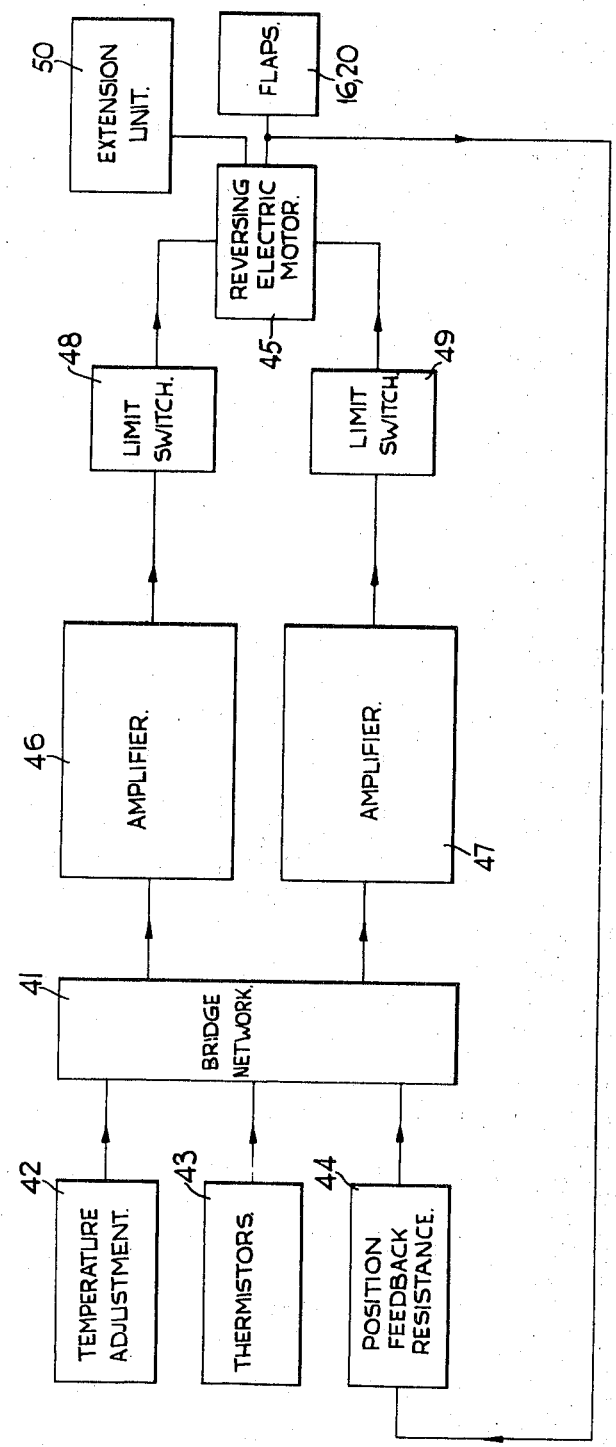

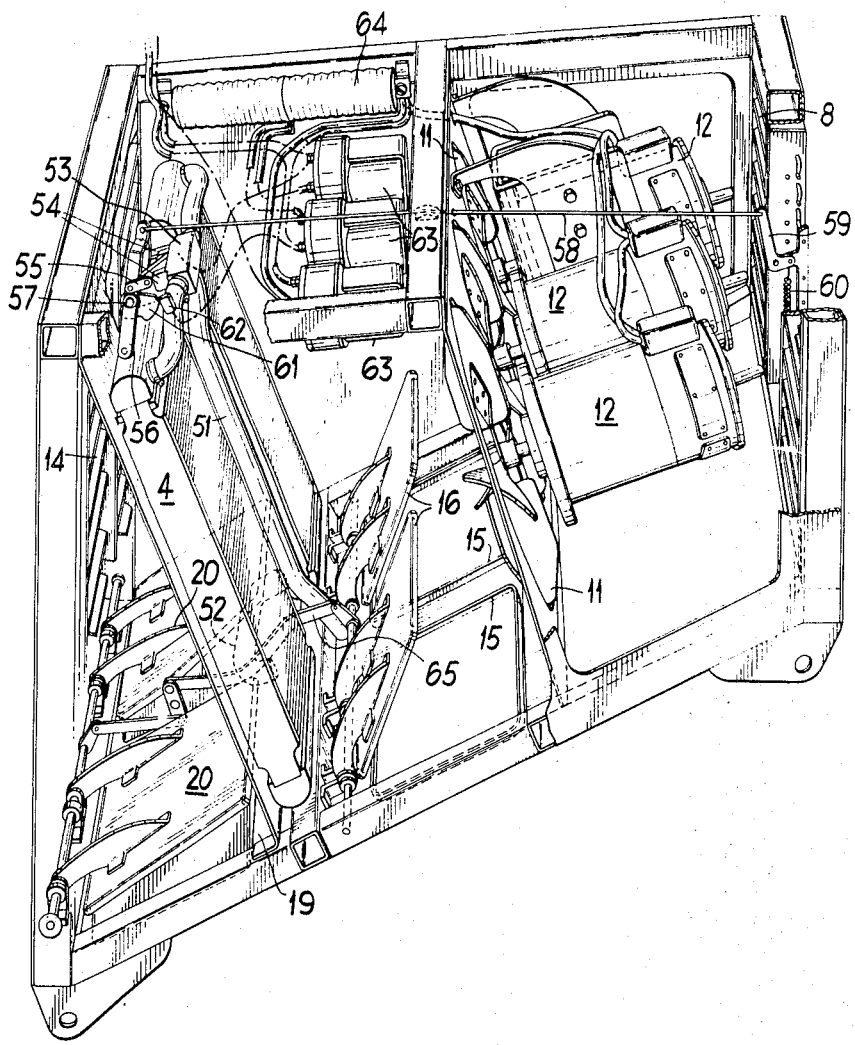

3,528,607
ENGINE COOLING AND PASSENGER COMPARTMENT HEATING APPARATUS FOR MOTOR VEHICLES
Anthony G. Plackett, Aston, England, assignor to Smiths Industries Limited, London, England, a British company
Filed Jan. 29, 1968, Ser. No. 701,492
Claims priority, application Great Britain, Jan. 30, 1967, 4,501/67
Int. Cl. G05d 23/02
U.S. Cl. 237—2                              12 Claims

ABSTRACT OF THE DISCLOSURE

Combined engine cooling and passenger compartment heating apparatus for a road vehicle in which electrically driven fans blow air through a heat exchanger in the engine coolant circuit and the air required to heat the passenger compartment is passed to a mixing compartment from which air can flow to the passenger compartment, the remainder of the heated air being exhausted to the vehicle exterior. Unheated air is also blown into the mixing compartment and the proportions of unheated and heated air entering the mixing compartment is controlled to reduce short term temperature fluctuations of the air entering the passenger compartment from the mixing compartment.

---

This invention relates to engine cooling and passenger compartment heating apparatus for motor vehicles.

According to this invention there is provided engine cooling and passenger compartment heating apparatus for a motor vehicle comprising a heat exchanger arranged to receive coolant from the vehicle engine and designed to dissipate at least the majority of the excess heat of the vehicle engine, means for causing air to flow through the heat exchanger at a rate dependent on the coolant temperature, an air mixing compartment having two inlet openings through one of which unheated air can enter and through the other of which air from the stream of air which has been caused to pass through the heat exchanger can enter, and from which air can flow to the passenger compartment of the vehicle, an opening through which the air caused to pass through the heat exchanger and which does not enter the mixing compartment can discharge to the exterior of the vehicle, valve means which control the proportions of air reaching the mixing compartment through its two inlet openings, and control means for actuating the valve means in a manner to reduce short term fluctuations of the temperature of the air entering the passenger compartment, the control means being sensitive at least to the temperature of the air entering the passenger compartment from the mixing compartment.

In use, if the rate of air flow through the heat exchanger changes then the temperature and pressure of the air entering the mixing compartment after passing through the heat exchanger will change and thus the temperature of the air entering the passenger compartment from the mixing compartment will also change. The control means respond to this change and actuate the valve means in the sense to restore the temperature of the air entering the passenger compartment to its original value.

Preferably the apparatus comprises further valve means arranged to control the flow of air through the opening through which air can discharge to the exterior of the vehicle, and a thermally responsive actuator arranged to be subjected to the coolant temperature and to actuate the further valve means in the sense to increase the flow of air through the opening in response to an increase in coolant temperature.

Preferably the means for causing air to flow through the heat exchanger comprises a variable speed fan driven by an electric motor, the motor speed being controlled by a thermally responsive actuator which is arranged to be responsive to the coolant temperature.

The thermally responsive actuator which controls the motor speed is preferably the actuator which actuates the further valve means.

Preferably unheated air is caused to enter the mixing compartment by the said means for causing air to pass through the heat exchanger.

Preferably the apparatus comprises an air inlet compartment having a first inlet through which air from the exterior of the vehicle can flow, and a second inlet through which air from the passenger compartment can flow, and third valve means arranged to control the flow of air through the first inlet and controlled by the thermally responsive actuator which controls the said further valve means.

Preferably the control means are also sensitive to the air temperature inside the passenger compartment, and the air temperature outside the vehicle.

The heat exchanger may be made up of a plurality of sub-units or may be of unitary construction. The sub-units may be connected in parallel in the coolant circuit.

In one embodiment the apparatus comprises an air refrigerating system, the air refrigerating system including an evaporator disposed in the air mixing compartment.

Engine cooling and passenger compartment heating apparatus for a motor vehicle in accordance with this invention will now be described, by way of example only, with reference to the accompanying schematic drawings of which:

Figure 2:
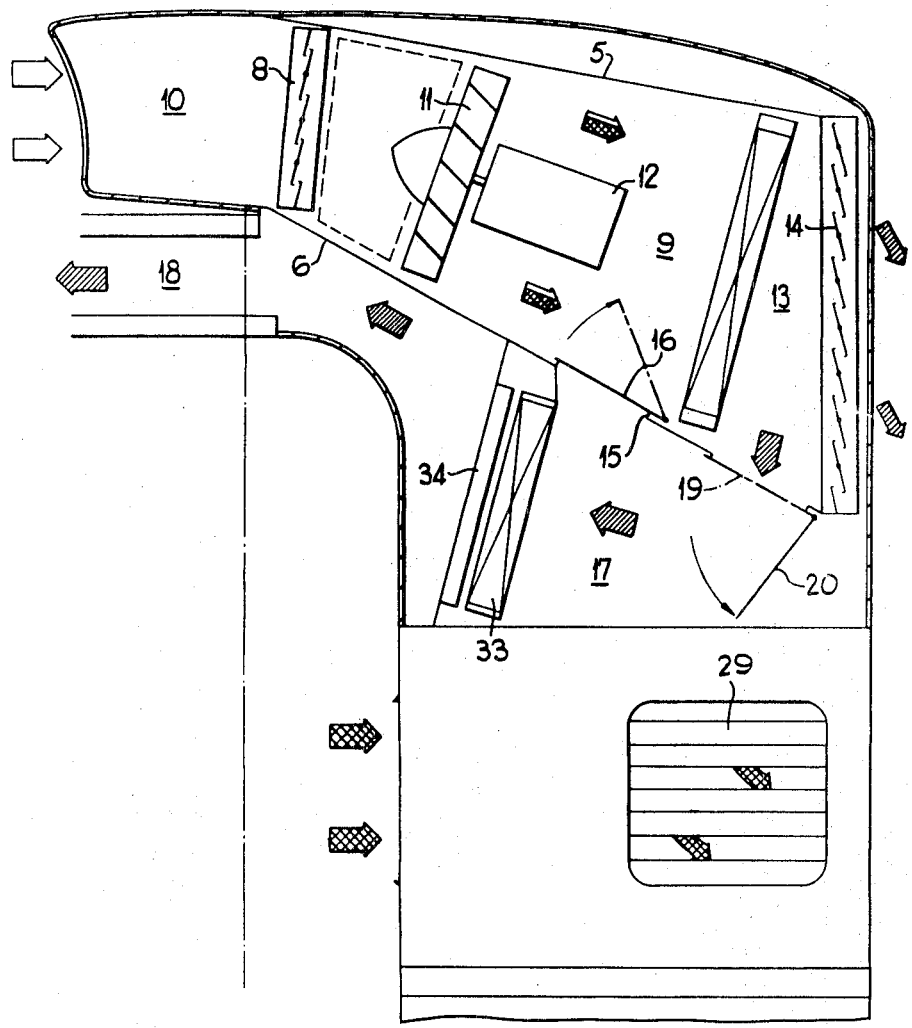
FIG. 2 is a schematic side elevation of half of the apparatus with its flaps in the positions they take up in extremely cold weather.
Figure 3:
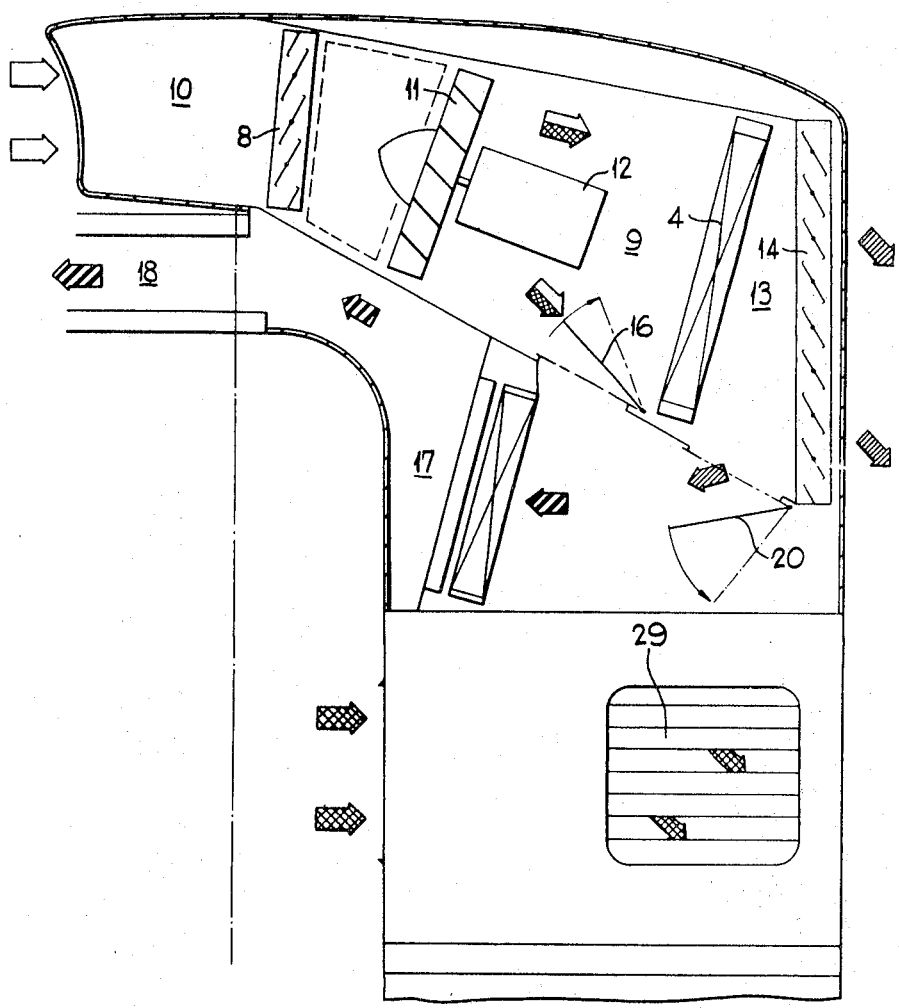
FIG. 3 is an elevation similar to that of FIG. 2 with the flaps in the positions they take up in moderately cold weather.
Figure 4:
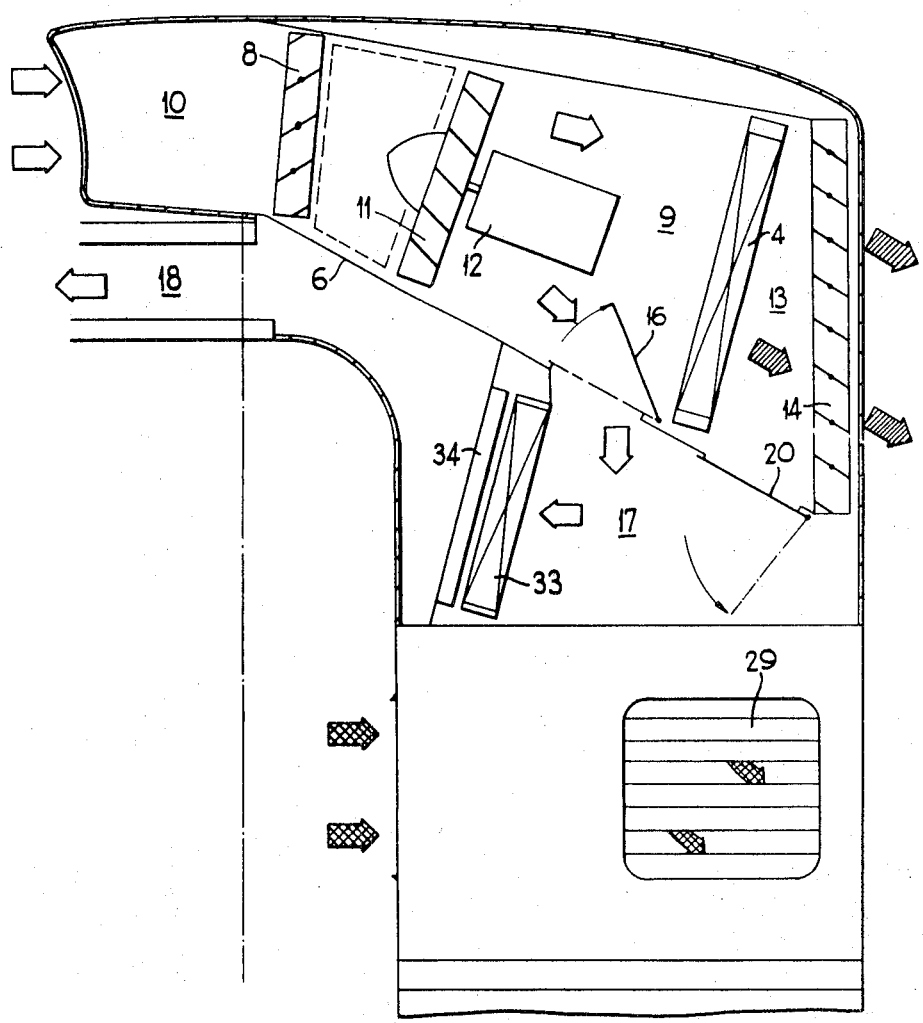
FIG. 4 is a side elevation similar to FIG. 2 with the flaps in the positions they take up in hot weather (it is to be noted that FIGS. 2 to 4 do not show a condenser 32 shown in FIG. 1)

FIG. 5 explains the meaning of arrows used in FIGS. 2 to 4; and

FIG. 6 is a block diagram of an electronic controller which positions flaps 16, 20 and 26 shown in FIGS. 1 to 4.

FIG. 7 is another cut away view of the apparatus particularly illustrating the control of flaps by a thermostat responsive to coolant temperature.

Figure 1:
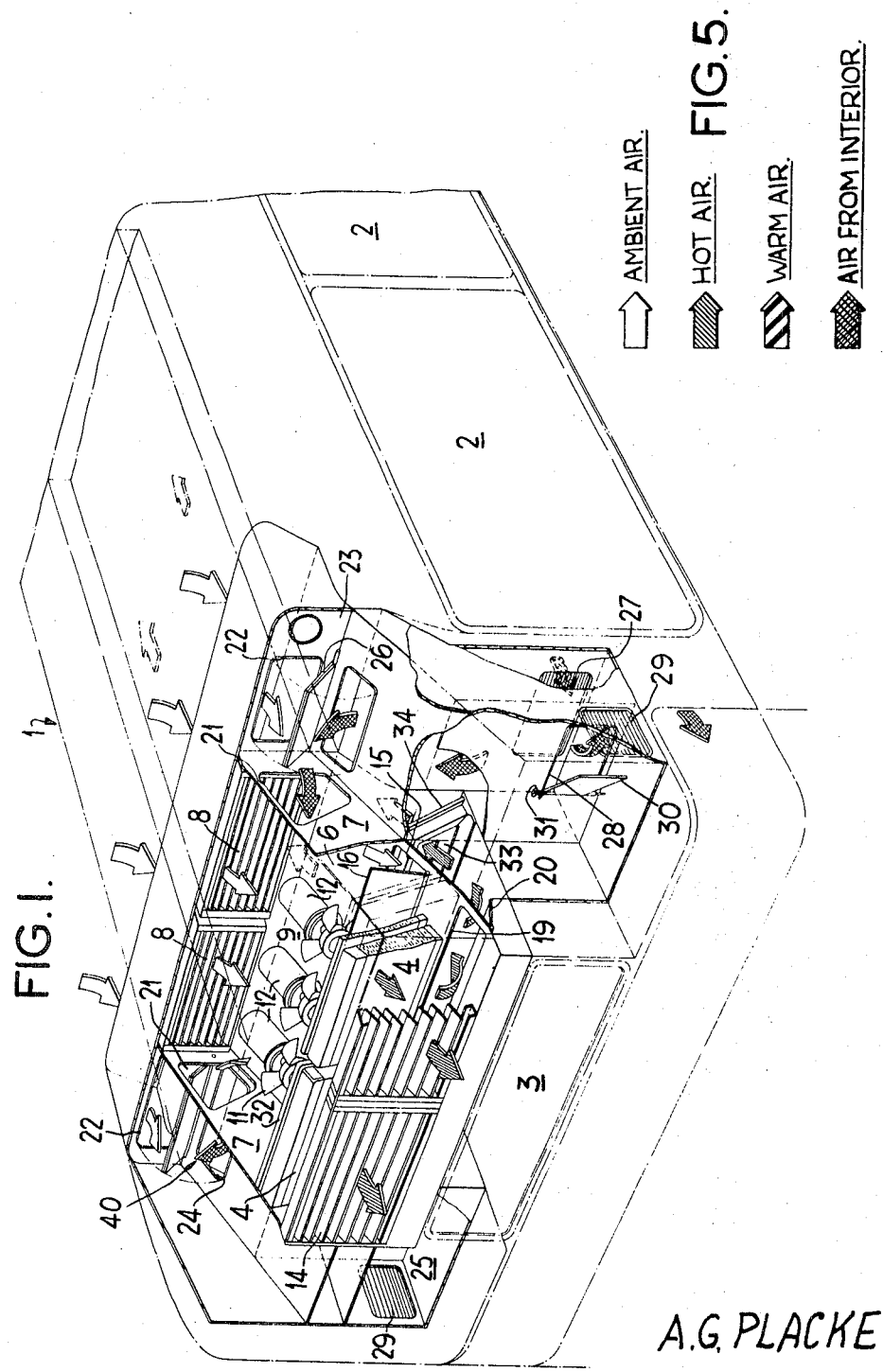
FIG. 1 is a cut away view of the apparatus located in a single-decker coach.

FIG. 2 is a cut away view of the part of the apparatus above a partition 6 from a slightly different direction to that of FIG. 1, the details illustrated in FIG. 2 being slightly different to those of FIG. 1.

Referring to FIGS. 1 to 5 and 7 the apparatus is located at the rear end of a single decker coach 1, the side windows of which are indicated by the reference numeral 2. The apparatus is situated above, and on both sides of, the rear window 3 of the coach.

The apparatus has two similar radiator matrices 4 which are supplied, in parallel, with liquid coolant from the vehicle engine (not shown) through flow and return pipes 51 and 52, the matrices 4 being only matrices provided to cool the coolant. No valve is provided to control the coolant flow which is maintained by a pump (not shown). The matrices 4 together with upper and lower nearly horizontal sheet metal partitions 5 and 6, two vertical sheet metal partitions 7, and a group of air inlet flaps 8 define an air inlet compartment 9. The flaps 8 are adjustable and control the air entering the compartment 9 through a passage 10 which extends the whole width of the coach 1 and which communicates with the exterior of the coach. The passage 10 is located on the roof of the coach and faces forwardly so that the forward movement of the coach induces air to enter the passage 10.

Three similar axial fans 11 are located in the compartment 9 and are driven by separate electric motors 12, the speeds of which are controlled as will be explained. The matrices 4, the sheet metal partitions 5, 6 and 7 and a group of air outlet flaps 14 define a compartment 13 from which air can discharge to the exterior of the vehicle through the flaps 14. The flaps 14 are adjustable and control the rate of discharge of air and together with the flaps 8 are controlled by a wax thermostat assembly 53 (FIG. 7) responsive to coolant temperature. The wax thermostat assembly 53 is mounted in the flow pipe 51 at the point where it divides into two parts each leading to an individual one of the matrices 4. The wax thermostat assembly 53 has two wax thermostats of conventional construction and each thermostat has an output member 54 which projects from the assembly 53 to an extent dependent on the coolant temperature. Each output member 54 engages an arm 55 secured to one limb 56 of a bifurcated lever. Each limb 56 is rotatable about a pin 57 and the limbs are joined at their upper and lower ends. The lower end of the lever is connected through a linkage (not shown) to the flaps 14 while the upper end of the lever is connected through a link 58, and a further lever 59 (which is restrained by a spring 60) to the flaps 8. As the coolant temperature rises the flaps 8 and 14 open simultaneously to an extent dependent on the coolant temperature.

Each limb 56 carries a cam 61 (the two cams 61 are not identical) which operates an individual micro-switch 62 (only one cam 61 and one micro-switch 62 can be seen). The micro-switches 62 are arranged to control the energisation of three solenoids 63 connected, together with a tapped wire wound resistor 64, in a control circuit for the motors 12. As the coolant temperature increases the two micro-switches 62 are operated sequentially to increase the speeds of the motors 12.

It will be seen that the wax thermostat assembly 53 is arranged to open the flaps 8 and 14 progressively and to increase the motor speeds in steps as the coolant temperature increases.

The compartment 9 communicates with an air mixing compartment 17 disposed immediately below it through an opening 15 (in two parts) in the partition 6, the flow of air through the opening 15 being controlled by a flap 16 (also in two parts). The compartment 13 communicates with the compartment 17 through an opening 19 (in two parts) in the partition 6, the flow of air through the opening 19 being controlled by a flap 20 (also in two parts). The flaps 20 and 16 are connected by a link 65 and are positioned by an electronic controller which will be described. The compartment 17 communicates with a passage 18 which leads into the passenger compartment and communicates with ducts which pass over the seats in the coach and are provided with a number of air outlets.

On each side of the compartment 9 there is located a compartment 40 which is defined by the partitions 5, 6 and 7 and an exterior wall of the coach 1. Each of the compartments 40 communicates with the compartment 9 through an opening 21 in its respective wall 7. Each compartment 40 also communicates with the passage 10 through an opening 22 in a wall 23 in line with the flaps 8 and, through an opening 24 in the partition 6, with a compartment 25 immediately below it. The air flow through the openings 22 and 24 is controlled by a flap 26 itself controlled by the electronic controller, the arrangement being that the flaps 26 never completely close the openings 22. Air from the passenger compartment can enter each compartment 25 through an opening 27 and can also leave the compartment 25 through an opening 28 and louvres 29 in the coach wall. The air flow through each opening 28 is controlled by a flap 30 urged by a spring 31 to its closed position.

A condenser 32 (not shown in FIGS. 2 to 4 and 7) of an air refrigerating unit is located in the compartment 9 adjacent and parallel to the radiators 4. Thus unit also has an evaporator 33 located in the compartment 17, a compressor driven by the vehicle engine through a clutch, an air thermostat and a sight glass (all not shown). A filter 34 is located in the compartment 17 and serves to clean the air entering the passage 18.

The electronic controller which will be described in more detail later has a manual adjustment to enable the temperature of the air in the passenger compartment to be set at a desired value. The controller has three thermistors which sense the outside temperature, the temperature within the passenger compartment and the temperature of the air entering the passenger compartment from the passage 18 respectively. It also has two reversible D.C. motors, one of which operates the flaps 16 and 20, the arrangement being that as flap 16 is moved away from opening 15, flap 20 is moved towards opening 19. The other motor controls the flap 26 and it is arranged that when flap 20 reaches the position in which it closes opening 19, flap 26 is moved from the position in which it partially closes opening 22 to the position in which it closes opening 24.

The operation of the apparatus will now be described. If the ambient temperature is very cold, then the flaps are in the positions shown in FIG. 2 and the refrigerating unit is, of course, inoperative. It is assumed that the coolant temperature is low so that the fans 11 are rotating slowly and the flaps 8 and 14 are nearly but not completely closed. Air from the exterior of the vehicle therefore enters the compartment 9 through the passage 10 and air also enters the compartment 9 from the compartments 40, this air being mainly recirculated air from the passenger compartment. The flaps 26 are, under the control of the controller, in the position in which they close to the greatest extent possible, the openings 22. It will be noted that however cold the coolant is, some air from the vehicle exterior always enters the compartment 9 as the openings 22 are never completely closed. The flaps 16 and 20 are positioned by the controller so that they close the opening 15 and permit the flow of air through opening 19 respectively. All the air entering the compartment 9 therefore passes through the matrices 4 to the compartment 13 and thereby cools the coolant and is itself heated. Some of the air entering the compartment 13 discharges through the flaps 14 and some passes through the compartment 17 and the passage 18 to the passenger compartment. As some air from the exterior of the coach is being blown into the passenger compartment by fans 11, the pressure inside the passenger compartment exceeds that outside and the flaps 30 are opened, against the action of the springs 31, to a small extent to permit the discharge of air from the compartments 25 through the louvres 29.

FIG. 3 shows the various flaps in the positions they take up in moderately cold weather. The flaps 8 and 14 are open to a greater extent and the speed of the motors 12 is somewhat greater. The proportion of the air entering the compartment 9 which has come through the passage 10 is thus increased despite the fact the flaps 26 have not been moved. The flaps 16 and 20 are in intermediate positions in which air can enter the mixing compartment 17 through both openings 15 and 19 so that the air flowing to the passage 18 is warm air and is at the temperature to which the controller is set. Some of the air entering the compartment 13 discharges through the flaps 14, the quantity of air passing through those flaps being increased in comparison to the quantity in extremely cold weather.

If the air temperature in the passenger compartment changes then the controller repositions the flaps 16 and 20, thereby changing the relative proportions of heated and unheated air reaching the compartment 17, in the sense to restore that air temperature to its desired value. The electronic controller also prevents the temperatures of the air in the passage 18 altering rapidly as it would if no controller were to be provided. The electronic controller does this because it is sensitive to the temperature of the air leaving passage 18. Such changes in temperature would occur because the temperature of the air in the compartment 17 will change when the quantity of air entering the compartment 9 changes. This latter quantity will of course vary considerably with road speed and coolant temperature. The air temperature in the compartment 17 changes when the quantity of air entering the compartment 9 changes because the air temperature in compartment 13 is dependent in part on the speed of the air passing through the matrices 4 and because the proportions of air entering the compartment 17 from the compartments 9 and 13 is dependent in part on the quantity of air entering the compartment 9. The controller prevents these changes of air temperature in the passage 17 by repositioning the flaps 16 and 20.

The flaps 30 will open a little further under these conditions in comparison to extremely cold weather as a greater quantity of air from outside the vehicle is entering the passenger compartment.

FIG. 4 shows the flaps in the positions they take up when the weather is hot. The flaps 8 and 14 are shown fully open and the speed of the motors 12 is increased. Flap 20 closes opening 19 and flap 16 does not limit the flow of air through opening 15. Flaps 26 have been moved to close openings 24. The quantity of air entering the compartment 9 from the exterior of the vehicle is increased and most of this air entering compartment 9 passes through the condenser 32 and the matrices 4 to the vehicle exterior. The increased air flow cools the coolant adequately. Some of the air entering compartment 9 passes through opening 15 and flows to the passage 18 and the passenger compartment. No recirculated air enters the passenger compartment and an increased quantity of air from the vehicle exterior enters the passenger compartment. The flaps 30 are therefore opened further to permit the discharge of a greater quantity of air from the passenger compartment.

When the flaps 26 are positioned to close the openings 24 a switch is simultaneously operated to bring the refrigerating unit under the control of its thermostat. Thus in hot weather when the temperature in the vehicle exceeds a preset value the compressor is started so that the air passing through the compartment 17 is cooled by the evaporator 33. The condenser 32 is also cooled by the air passing through the compartment 9. The compressor clutch engages and disengages rendering the compressor operative and inoperative under the control of the thermostat.

Referring now to FIG. 6 the electronic controller has a bridge network 41 which has the three thermistors 43 connected in series in one arm, the thermistors being responsive respectively to the outside air temperature, the air temperature in the passenger compartment, and the temperature of the air leaving the passage 18. A variable resistor 44 driven by an output motor 45 is connected in series with the thermistors in the same arm. A manually adjustable resistor 42 used to set the passenger compartment air temperature is connected in another arm of the bridge network 41. Two amplifiers 46 and 47 are connected to the bridge network 41 and amplify the output signal of the bridge network output when it is positive and negative respectively. The amplifiers 46 and 47 are connected to separate windings of the motor 45 through limit switches 48 and 49 respectively. The motor 45 positions the flaps 16 and 20 through a gear box (not shown) and, as already stated operates the variable resistor 44. The motor 45 also actuates an extension unit 50 which will be described.

In use, if the bridge network becomes unbalanced due for example to a change in the air temperature in the passage 18, then a signal is applied to one of the amplifiers. Assuming that the air temperature has fallen the amplifier 46 will energise the motor 45 to cause it to move the flap 16 towards the opening 15 and the flap 20 away from the opening 19. It simultaneously adjusts the resistor 44 in the sense to rebalance the bridge network. Similarly the amplifier 47 energises its associated winding of the motor 45 when the temperature in the passenger compartment should be lowered. The limit switches 48 and 49 deenergise their associated windings in the motor 45 when the flap 20 has closed the opening 19 and when the flap 16 has closed the opening 15 respectively.

The extension unit 50 contains a motor which is provided with appropriate limit switches and which drive the flaps 26 through an appropriate gear box. This unit is energised by operation of a switch (not shown) when the limit switch 49 is opened and its motor is then driven in the sense to position the flaps 26 so that they close the openings 24. The flaps 26 are moved in the opposite direction at the same time as the limit switch 49 is closed again upon energisation of the amplifier 46.

We claim:
1. In a motor vehicle having a passenger compartment and drivable by a liquid-cooled combustion engine, engine cooling and passenger compartment heating apparatus comprising:
 (a) a heat exchanger which receives liquid coolant from the vehicle engine to dissipate at least the majority of the excess heat of the vehicle engine;
 (b) air impelling means to cause air to flow through the heat exchanger and be heated thereby;
 (c) means sensitive to the coolant temperature and operably connected to said air impelling means to cause air to flow through the heat exchanger at a rate dependent on the coolant temperature;
 (d) an air mixing compartment having at least two inlet openings and an outlet;
 (e) first air passage means for unheated air upstream of said heat exchanger to guide the unheated air to said air mixing compartment through one of said two inlet openings;
 (f) second air passage means for heated air downstream of said heat exchanger to guide the heated air to said air mixing compartment through the other of said two inlet openings;
 (g) third air passage means to guide air from said air mixing compartment through said outlet to the passenger compartment of the vehicle;
 (h) an opening in said second air passage means to permit the passage therethrough and exteriorly of the vehicle of heated air which does not enter the air mixing compartment;
 (i) valve means to control the proportions of heated and unheated air entering the air mixing compartment through said two inlet openings; and
 (j) temperature sensitive control means sensitive at least to the temperature of the air in said third air passage means and operable on said valve means to position said valve means in a manner to reduce short term fluctuations of the temperature of the air entering the passenger compartment via said third air passage means.

2. In a motor vehicle having a passenger compartment and drivable by a liquid-cooled combustion engine, engine cooling and passenger compartment heating apparatus as claimed in claim 1 which comprises further valve means which control the flow of air through said opening in said second air passage means, and a thermally responsive actuator which is responsive ot the coolant temperature, which is connected to the further valve means and which actuates the further valve means in the sense to increase the flow of air through said opening in response to an increase in coolant temperature.

3. In a motor vehicle having a passenger compartment and drivable by a liquid-cooled combustion engine, engine cooling and passenger compartment heating apparatus as claimed in claim 1 wherein said air impelling means comprise a fan and an electric motor which drives the fan, said means being responsive to the coolant temperature and comprising a thermally responsive actuator which is responsive to the coolant temperature and which controls the speed of the motor.

4. In a motor vehicle having a passenger compartment and drivable by a liquid-cooled combustion engine, engine cooling and passenger compartment heating apparatus as claimed in claim 2 wherein said air impelling means comprise a fan and an electric motor which drives the fan, said means being responsive to the coolant temperature and comprising a thermally responsive actuator which is responsive to the coolant temperature and which controls the speed of the motor.

5. In a motor vehicle having a passenger compartment and drivable by a liquid-cooled combustion engine, engine cooling and passenger compartment heating apparatus as claimed in claim 4 wherein the thermally responsive actuator which controls the speed of the motor is the thermally responsive actuator which is connected to the further valve means.

6. In a motor vehicle having a passenger compartment and drivable by a liquid-cooled combustion engine, engine cooling and passenger compartment heating apparatus as claimed in claim 2 which comprises an air inlet compartment having a first inlet through which air from the exterior of the vehicle can flow, and a second inlet through which air from the passenger compartment can flow, and third valve means which control the flow of air through the first inlet and are controlled by the thermally responsive actuator which is connected to said further valve means.

7. In a motor vehicle having a passenger compartment and drivable by a liquid-cooled combustion engine, engine cooling and passenger compartment heating apparatus as claimed in claim 1 wherein unheated air is caused to enter the mixing compartment by said air impelling means.

8. In a motor vehicle having a passenger compartment and drivable by a liquid-cooled combustion engine, engine cooling and passenger compartment heating apparatus as claimed in claim 1 wherein the control means are also sensitive to the air temperature inside the passenger compartment, and independently thereof the air temperature outside the vehicle.

9. In a motor vehicle having a passenger compartment and drivable by a liquid-cooled combustion engine, engine cooling and passenger compartment heating apparatus as claimed in claim 1 wherein the heat exchanger is made up of sub-units.

10. In a motor vehicle having a passenger compartment and drivable by a liquid-cooled combustion engine, engine cooling and passenger compartment heating apparatus as claimed in claim 9 wherein the sub-units are connected in parallel in the coolant circuit.

11. In a motor vehicle having a passenger compartment and drivable by a liquid-cooled combustion engine, engine cooling and passenger compartment heating apparatus as claimed in claim 6 comprising, air ducting means to guide air from the passenger compartment to the second inlet of said air inlet compartment; an outlet opening in said air ducting means through which air not passing through said second inlet can pass exteriorly of the vehicle; and fourth valve means to control the flow of air through said second inlet of the air inlet compartment.

12. In a motor vehicle having a passenger compartment and drivable by a liquid-cooled combustion engine, engine cooling and passenger compartment heating apparatus as claimed in claim 11, comprising means operably connecting said fourth valve means to said thermally responsive actuator to be controlled thereby.

References Cited

UNITED STATES PATENTS

| | | |
|---|---|---|
| 2,189,895 | 2/1940 | Grutzner. |
| 2,837,288 | 6/1958 | Owen et al. |
| 3,263,739 | 8/1966 | Gaskill _____ 165—23 |
| 3,325,100 | 6/1967 | Fairbanks. |

EDWARD J. MICHAEL, Primary Examiner

U.S. Cl. X.R.

237—12.3